Figure 1:
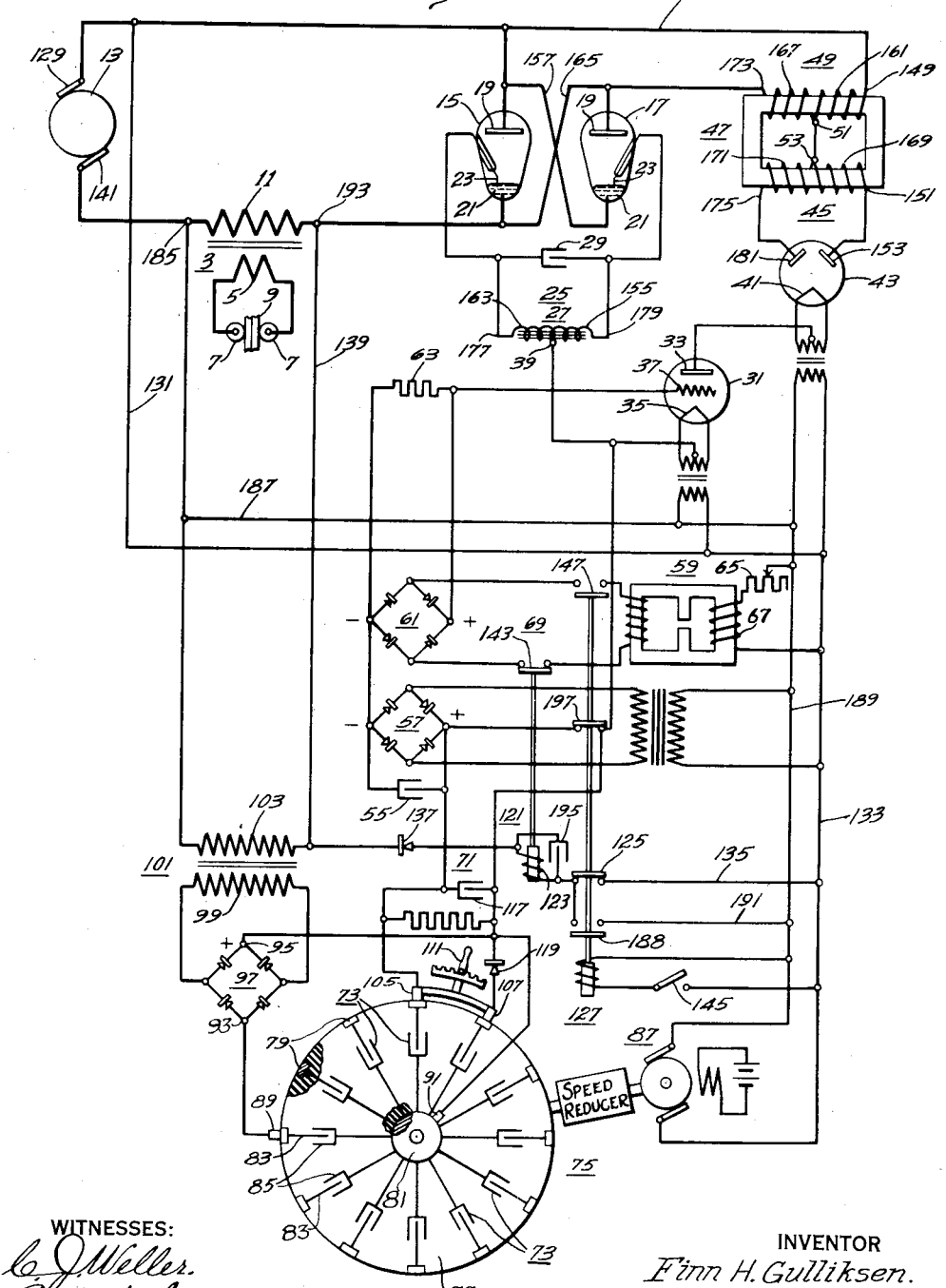

May 20, 1941.  F. H. GULLIKSEN  2,242,948
ELECTRIC DISCHARGE APPARATUS
Filed Oct. 21, 1938  2 Sheets-Sheet 1

WITNESSES:
C. J. Weller.
Wm. C. Groome

INVENTOR
Finn H. Gulliksen.
BY
F. W. Lyle
ATTORNEY

May 20, 1941.  F. H. GULLIKSEN  2,242,948
ELECTRIC DISCHARGE APPARATUS
Filed Oct. 21, 1938  2 Sheets-Sheet 2

WITNESSES:

INVENTOR
Finn H. Gulliksen.
BY
F. W. Lyle
ATTORNEY

Patented May 20, 1941

2,242,948

UNITED STATES PATENT OFFICE 2,242,948

ELECTRIC DISCHARGE APPARATUS

Finn H. Gulliksen, Pittsburgh, Pa., assignor to The Westinghouse Electric & Manufacturing Company, East Pittsburgh, Pa., a corporation of Pennsylvania Application October 21, 1938, Serial No. 236,206

18 Claims. (Cl. 250—27)

My invention relates to electric discharge apparatus, and has particular relation to apparatus for controlling the flow of welding current.

In resistance, spot and seam welding, power is supplied from an alternating-current source to the material to be welded in discrete pulses, each pulse being a predetermined number of half periods of the source in length. Where the material to be welded is relatively thin or is rapidly oxidized when heated, it is important that the magnitude of the current supplied for welding purposes and the timing during which the current flows, shall be measured out with precision. For welding of this type, it is accordingly, essential to provide a control system which accurately measures out a definite number of half cycles of current. The control system should, moreover, be simple in construction and reliable in operation, and its operation should not be appreciably affected by the variations in the potential of the source or in the circuit constants.

The apparatus constructed in accordance with the teachings of the prior art of which I am aware, in general, performs satisfactorily. However, I have found that where long welding time intervals of the order of 20 to 30 cycles are involved, a substantial error of the order of at least one-half cycle is introduced. Moreover, the apparatus is compensated for potential variations of the source, within a limited range only. Finally, each separate unit which is designed to be used for welding must be separately calibrated.

It is, accordingly, an object of my invention to provide a control system for resistance, spot and seam welding that shall precisely measure out the number of half-cycles of current required for welding purposes.

Another object of my invention is to provide a resistance, spot and seam welding system of simple construction that shall operate reliably and with precision.

A further object of my invention is to provide a resistance, spot and seam welding system in which no substantial variations shall be introduced by reason of variations in the source potential or in the circuit constants of the system.

A more general object of my invention is to provide a control system of simple structure that shall reliably and precisely measure out the current drawn by a load that requires power in discrete pulses a predetermined number of half-periods of the source in length.

A more specific object of my invention is to provide a resistance, spot and seam welding system with which long welding intervals, of the order of 20 to 30 periods of a commercial alternating source in length, shall be attainable with precision.

An ancillary object of my invention is to provide a system of simple structure incorporating a minimum of auxiliary discharge valves for controlling the current flow through a pair of main electric discharge valves of the immersed ignition electrode type connected in anti-parallel.

Another and more general ancillary object of my invention is to provide a novel circuit for controlling an electric discharge valve of the immersed ignition electrode type.

A further ancillary object of my invention is to provide a contrivance of simple and inexpensive structure for timing the current flow from a source to a load.

A still further ancillary object of my invention is to provide a circuit arrangement for limiting the current flow through a welding load to a definite value and preventing the flow of additional current through the load by reason of any changes in the timing system.

Still another ancillary object of my invention is to provide for a welding system in which the current flow is interrupted when a capacitor attains a predetermined charge, a contrivance for preventing residual current flow by reason of the leakage discharge of the capacitor.

More concisely stated, it is an object of my invention to provide a simple and inexpensive system for precisely measuring out a predetermined number of half-cycles of current to be supplied from an alternating-current source to a load that shall operate with precision regardless of the number of half-cycles required, and that shall not incorporate compensating equipment.

In accordance with my invention, power is supplied to the material to be welded from an alternating-current source through electric discharge valves of the arc-like type. The main valves are controlled by an auxiliary discharge valve of the arc-like type. When the latter is rendered conductive, current flows through the main valves and the load, and when the auxiliary valve is non-conductive, the current flow through the main valves is interrupted.

The auxiliary valve is rendered conductive by the application of energizing potential in its control circuit. It is rendered non-conductive by the application in its control circuit of a potential counteracting the energizing potential. In apparatus constructed in accordance with the teachings of the prior art, the time during which the auxiliary valve is conductive is measured out by the rate of charge or discharge of a capacitor permanently connected in the control circuit of the auxiliary valve. In such a case, a slight change in the rate of charge or discharge may produce a substantial change in the length of a long welding interval. In accordance with my invention the time interval is measured out by first successively charging a number of capacitors and then connecting the charged capacitors in the control circuit of the auxiliary valve in such manner that the potential of each capacitor in its turn counteracts the energizing potential. Thereafter, the charged capacitors may be discharged in preparation for another operation.

The capacitors are charged, connected in the control circuit and discharged in synchronism with the supply source. The timing of the operations is such that one capacitor is charged during each half-period of the source. The charged capacitor may then be connected in the control circuit of the auxiliary valve a predetermined number of half-periods later and discharged after a further number of half-periods. While the capacitor is charging, and before it is applied in the control circuit of the auxiliary valve, welding current flows. At the end of the first number of half periods, however, the flow of welding current is interrupted and the interruption continues for the second number of half-periods. After this, the apparatus is in condition for a new operation and this may take place at any time.

It is to be noted that the potential of the capacitors is not applied in the control circuit of the auxiliary valve until after the desired number of half-periods. For this reason, the potential to which the capacitor is charged may be selected sufficiently large to mask any variations in the source potential or any variations arising from changes in the circuit constants. Compensating equipment is, therefore, unnecessary. Moreover, since the potential of the capacitors is only applied at the instant when the main valves are to be extinguished, and the number of half-periods are measured out by the synchronous equipment, there is no difficulty involved where long welding intervals of the order of 20 to 30 periods are required. The synchronous equipment measures out 20 or 30 periods with the same facility that it measures out one or two.

The control system for a pair of electric discharge valves of the immersed ignition electrode type connected in anti-parallel is simplified, in accordance with my invention, by interconnecting the ignition electrodes of the valves through a high impedance network made up of relatively low impedance elements, and supplying ignition current to the valves through the low-impedance elements. In particular, the ignition electrodes are interconnected by a parallel tuned network and the ignition current is supplied through the reactor of the network.

Finally, I provide an auxiliary relay which opens the energizing circuit for the auxiliary valve after each welding interval and thereby prevents the flow of residual welding current by reason of the leakage discharge of the timing capacitors. The exciting coil of the relay is initially connected directly across the source and the relay is, therefore, maintained energized by the source. Simultaneously with the initiation of the flow of welding current, the last mentioned circuit through the relay coil and the source is interrupted for the remainder of the welding operation and the relay coil is connected directly across the welding load. After the auxiliary valve is rendered non-conductive by the application of the capacitor potential, the relay is deenergized and the application of energizing potential in the control circuit is interrupted. The circuit remains deenergized until the initiation of a new welding operation.

Figure 2:
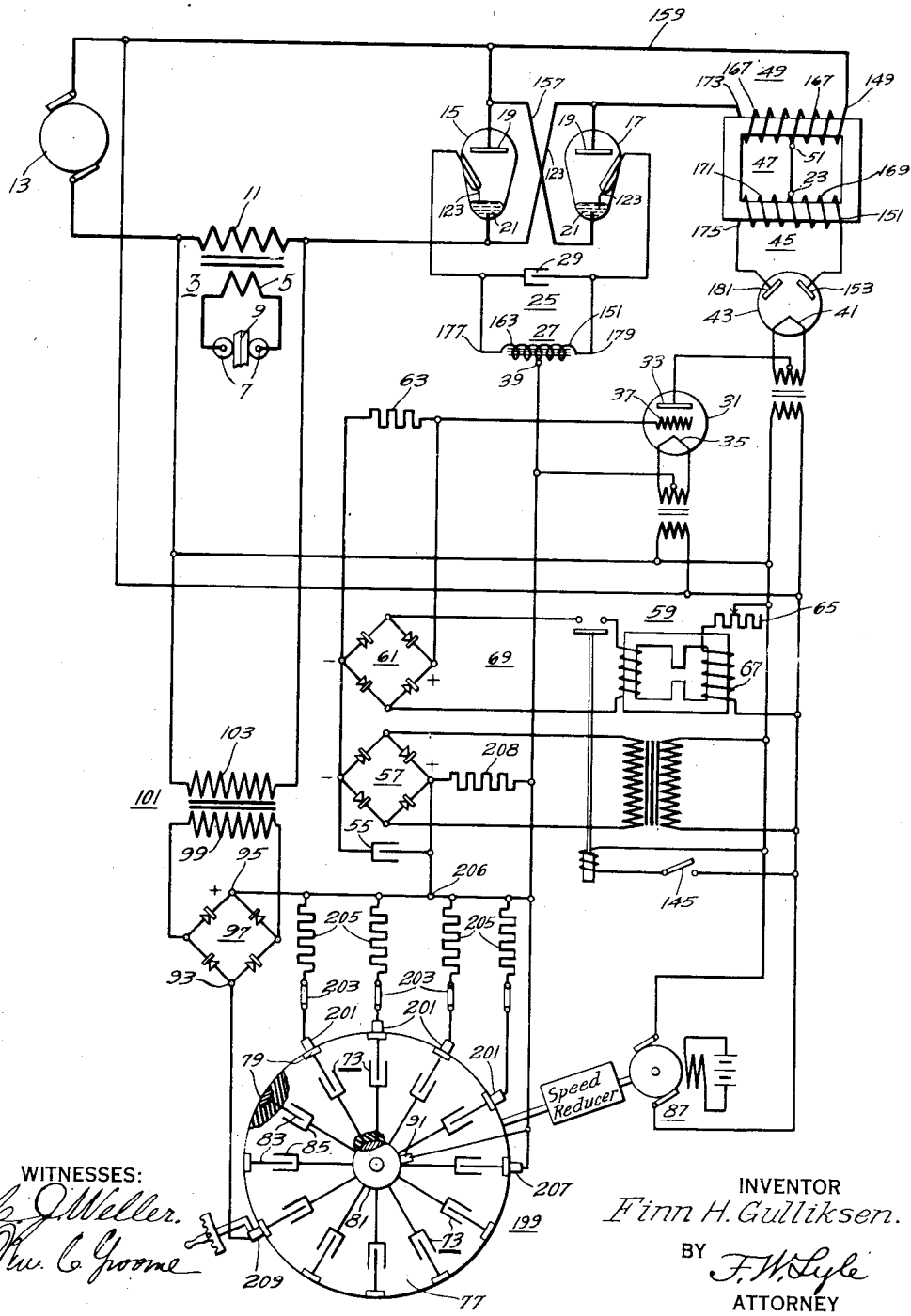

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawings, in which:

Figure 1 is a diagrammatic view showing a spot welder constructed in accordance with my invention; and Fig. 2 is a diagrammatic view showing a seam welder constructed in accordance with my invention.

The apparatus shown in Fig. 1 comprises a welding transformer 3, to the terminals of the secondary 5 of which a pair of welding electrodes 7 are connected. The electrodes engage the material 9 to be welded and when current is transmitted through the primary 11 of the transformer, welding current flows through the material.

The primary of the transformer is supplied from an alternating-current source 13, which may be of the usual 60-cycle commercial type, through a pair of electric discharge valves 15 and 17 connected in anti-parallel. The valves are of the immersed-ignition-electrode type and each has an anode 19, a mercury pool cathode 21, and an ignition electrode 23. The ignition electrodes 23 of the valves are interconnected by a network 25 consisting of an inductor 27 and a capacitor 29 connected across the terminals of the inductor. The network 25 is tuned to the frequency of the source and, therefore, the impedance between its terminals is large so that current flow from the source 13 through the ignition electrodes 23 and the network 25 is negligible.

For the purpose of producing sufficient ignition current flow to render discharge valves conductive, an auxiliary valve 31 is provided. The latter is preferably of the arc-like type and comprises an anode 33, a hot cathode 35, a control electrode 37 and a gaseous medium at a suitable pressure. The cathode 35 of the auxiliary valve 31 is connected to an intermediate tap 39 of the inductor 27. The anode 33 of the auxiliary valve is connected to the cathode 41 of a full-wave rectifier valve 43. The latter is, in turn, supplied from the secondary 45 of a transformer 47, the primary 49 of which is connected directly across the source 13. The primary and secondary windings 45 and 49 of the transformer are provided with intermediate taps 51 and 53 maintained at a common potential.

When the apparatus is not in operation, the auxiliary valve 31 is maintained non-conductive by a biasing capacitor 55 supplied from the source 13 through a rectifier 57. The biasing potential is counteracted by positive impulses of short duration compared to a half-period of the source when the auxiliary valve 31 is to be rendered conductive for a welding operation. The impulses are supplied from the source 13 through an impulsing transformer 59 and a rectifier 61 across a resistor 63 connected in the control circuit of the auxiliary valve 31 in series with the biasing capacitor 55. A rheostat 65 is connected in series with the primary 67 of the impulsing transformer 59 and may be set at a predetermined value to determine the angle in the half-periods of the source at which the impulses occur. When the apparatus is not in operation, the secondary circuit 69 of the impulsing transformer is maintained open and, therefore, the impulses are not supplied across the resistor 63 in the control circuit.

When the energizing potential is supplied in the control circuit of the auxiliary valve 31 and the latter is conducting, it may be again rendered non-conductive by the application of a counteracting potential through a stopping capacitor 71 also connected in the control circuit. The latter capacitor is normally uncharged but it is charged at a predetermined instant by one or the other of the capacitors 73 of a timing device 75.

The timing device comprises an insulating circular disc 77 provided at its periphery with a plurality of equally spaced conducting segments 79 and at its center with a conducting ring 81. The timing capacitors 73 correspond in number to the segments 79 and are mounted uniformly spaced on the disc 77 between the ring 81 and the segments. One plate 83 of each of the capacitors is connected to a corresponding segment 79. The other plate 85 of the capacitors is connected to the ring 81. The disc is rotated by a synchronous motor 87 which is, in turn, energized from the source 13.

A pair of fixed brushes 89 and 91 engage the periphery and the ring 81, respectively, of the disc 77. As the disc 77 rotates, the segments 79 and therefore, the capacitor plates 83 connected to them, successively engage the former brush 89 and the ring 81 continuously engages the latter brush 91. The periphery brush 89 is connected to the negative direct-current terminal 93 and the ring brush 91 to the positive terminal 95 of a rectifier 97 supplied from the secondary 99 of a transformer 101, the primary 103 of which is connected directly across the primary 11 of the welding transformer 3. Accordingly, when the welding transformer 3 is energized, the plates 83 of the capacitors 73 connected to the commutators 79 which engage the peripheral brush 89, are charged negative and the other plates 85 are charged positive.

The disc 77 is further provided with a pair of adjustable brushes 105 and 107 which engage the periphery of the disc and are spaced from each other by a distance equal to the distance between successive segments 79. The latter brushes are rigidly joined to each other by an insulating bar 109, and may be moved relative to the periphery of the disc by a handle 111 engaging the bar. One of the adjustable brushes 105 is connected to one plate 113 of the stopping capacitor 71 and the ring brush 91 is connected to the other plate 115 of the capacitor. Accordingly, when a timing capacitor 73 after being charged through the rectifier 97, moves to a position where its corresponding segment 79 engages the adjustable brush 105, the charge impressed on the timing capacitor 73 is transmitted to the stopping capacitor 71, and the potential initially impressed on the timing capacitors 73 distributes itself between the two capacitors 73 and 71, now connected in series, in the ratio of their capacities. The stopping capacitor 71 is thus provided with a potential which prevents the auxiliary valve from being rendered conductive.

The remaining adjustable brush 107 is connected to the ring brush 91 preferably through a dry rectifier 119. When a capacitor 73, the potential of which has been imparted to the stopping capacitor 71, is advanced by the angle between two successive segments 79 and its associated segment engages the adjustable brush 107, it is discharged and prepared for another operation. The rectifier 119 is provided in circuit with the brush 107 to prevent the stopping capacitor 71 from discharging through the brush.

The speed of the disc 77 and the number and spacing of the capacitors 73 and segments 79 may be so selected that a capacitor 73 moves through the angle between two segments during each half-period of the source 13. Accordingly, by setting the adjustable brushes 105 and 107 a predetermined number of segments from the fixed peripheral brush 89, the time interval between the charging of a capacitor 73 and its connection to the stopping capacitor 71 may be set at will. Since this interval commences with the current flow through the welding load 9, the number of half-periods during which current flows through the welding load may thus be set.

The insulation of the stopping capacitor 71 is imperfect and it may happen that after the termination of the flow of welding current, the blocking charge leaks away from the counteracting capacitor to a sufficient extent to nullify its counteracting effect. Under such circumstances, current would flow through the material 9 at a time when it is unexpected. To suppress this undesirable condition, an auxiliary relay 121, which opens the secondary circuit 69 of the impulsing transformer 59 after a welding operation, is provided. The exciting coil 123 of the relay is initially connected directly across the source 13 through a closed back contact 125 of a starting relay 127. The circuit for the exciting coil 123 of the auxiliary relay 121 extends from the upper terminal 129 of the source 13 through a conductor 131, a conductor 133, a conductor 135, the closed contactor 125 of the starting relay 127, the exciting coil 123 of the auxiliary relay, a rectifier 137, the conductor 139, the primary 11 of the welding transformer 3 to the lower terminal 141 of the source. The relay 121 is, therefore, normally energized and its contactor 143 is closed, maintaining the lower terminal of the secondary circuit 69 of the impulsing transformer 59 connected to its associated rectifier 61.

To initiate a welding operation, a circuit controller 145, which is preferably manually operated and may be a foot switch or a push button, is closed and energizes the starting relay 127. The upper contactor 147 of the relay 127 then closes, completing the secondary circuit 69 of the impulsing transformer 59. Energizing impulses are now supplied in the control circuit of the auxiliary valve 31 and the latter is rendered conductive. The path of the current flow through the auxiliary valve 31 depends on the polarity of the potentials impressed on the transformer 47 connected across the source 13. If the right-hand terminals 149 and 151 of the primary 49 and secondary 45, respectively, of the transformer are positive, the path is through a circuit extending from the right-hand terminal 151 of the secondary 45, through the right-hand branch 153—41 of the rectifier 43, the anode 33 and cathode 35 of the auxiliary valve 31 to the intermediate tap 39 of the inductor 27. At this point, the path divides into two parallel paths; one extending through the right-hand half 155 of the inductor 27, the ignition electrode 23 of the right-hand main valve 17, the associated cathode 21, a conductor 157, a conductor 159, the right-hand half 161 of the primary 49 of the transformer 47, to the common mid-tap 51—53 of the primary and secondary; and the other through the left-hand half 163 of the inductor 27, the ignition electrode 23 and cathode 21 of the left-hand main valve 15, a conductor 165, the left-hand windings 167 of the primary 49 of the transformer, to the common mid-tap 51—53.

The complete circuits through each of the branch paths which have just been traced include the primary 49 as well as the secondary 45 of the transformer 47 and the windings of the inductor 27. It happens that the polarities of the potentials impressed in the paths are such that the potential drop across the portions 155 and 163 of the inductor 27 counteract the potentials of the portions 161 and 167 of the primary 49 in each complete path, and therefore, the net potential which is effective at any time in a complete path is the potential of the portion 169 or 171 of the secondary 45 through which the current happens to be supplied.

This will be better understood by considering an actual example. Assume that the total source potential is 2E, that the transformer 47 has a 1:1 ratio, and that at the instant under consideration, the right-hand terminals 149 and 151 of the primary 49 and secondary 45, respectively, are positive, and the left-hand terminals 173 and 175, respectively, are negative. In such a case, the circuit through the ignition electrode 23 of the left-hand main valve 15 includes the potential —E from the intermediate tap 39 of the reactor to its left-hand terminal 177, the potential +E from the left-hand terminal 173 of the primary 49 to the common intermediate tap 51—53, and the potential +E from the intermediate tap 51—53 to the right-hand terminal 151 of the secondary 45. The net potential in this circuit is, therefore, +E. In the circuit of the other ignition electrode 23, the potentials introduced are +E between the intermediate tap 39 and the right-hand tap 179 of the inductor 27, the potential —E between the right-hand terminal 149 of the primary 49 and the common intermediate tap 51—53, and the potential +E between the common intermediate tap and the right-hand terminal 151 of the secondary. Again, the net potential is +E. Since the net potential in both paths is the same, the same current flows through the ignition electrodes 23 and also through the portions 155 and 163 of the reactor. Since the current through one portion of the reactor 27 is thus at all times equal and opposite to the current through the other portion, saturation of the reactor is prevented.

At the instant under consideration, the anode 19 of the left-hand main valve 15 is positive relative to its cathode 21. Therefore, the flow of ignition current through the left-hand ignition electrode 23 causes the left-hand main valve 15 to be rendered conductive and current to flow through the left-hand valve and the primary 11 of the welding transformer 3. Current does not flow through the right-hand main valve 17 because at this time, its anode 19 is negative relative to its cathode 21.

When the potential of the source reverses, the current through the auxiliary valve flows through the left-hand branch 131—41 of the rectifier 43, but otherwise substantially through the same conductors. However, at this time, the anode-cathode potential of the right-hand main valve 17 is positive and the latter is rendered conductive. It is to be noted that as soon as one or the other of the valves is rendered conductive— and this occurs immediately after the initiation of current flow through the associated ignition electrode 23—the primary of the transformer is short-circuited by the valve and the current flow through the ignition electrodes 23 is discontinued. In this manner, power loss and the other disadvantages arising from the continuous current flow through the ignition electrodes, are avoided.

As long as the auxiliary valve 31 continue conductive, the main valves 15 and 17 continue to conduct. Current flow through the auxiliary valve is initiated in each half-cycle at the instants corresponding to the settings of the rheostat 65 in the primary circuit 67 of the impulsing transformer 59 and current flow through the main valves is initiated at these instants. As long as the secondary circuit 69 of the impulsing transformer 59 remains closed, the auxiliary valve continues to conduct current and the main valves supply alternating-current to the primary of the welding transformer. The circuit 69 may be opened at the contactor 143 of the auxiliary relay 121, but this event is now prevented by a normally open contactor 188 of the starting relay 127 which is closed when the latter is energized thereby replacing the back contactor 125 which is now opened.

The newly closed contactor 188 connects the coil 123 of the auxiliary relay 121 directly across the primary 11 of the welding transformer 3. The circuit through the coil extends from the left-hand terminal 185 of the primary 11 of the welding transformer 3 through a conductor 187, the conductor 189, the conductor 191, the closed contactor 188 of the starting relay 127, the coil 123 of the auxiliary relay, the rectifier 137, the conductor 139 to the right-hand terminal 193 of the primary 11. The auxiliary relay 121 is prevented from becoming deenergized in the interval between the opening of the block contact 125 and the supply of current to it from the primary 11 of the welding transformer 3 by a capacitor 195 connected in parallel with its coil 123.

As current is now supplied to the welding transformer 3, the rectifier 97 which is supplied through the transformer 101 in parallel with the primary 11 is energized charges certain of the timing capacitors 73 as their associated segments 79 engage the fixed brush 89. The first capacitor 73 to be charged is rotated through an angle corresponding to the number of segment spacings for which the disc is set until its corresponding segment engages the adjustable brush 105 connected to the stopping capacitor 71. When this occurs, the potential from the impulsing transformer 59 is counteracted by the charge impressed on the stopping capacitor 71 and when the auxiliary valve 31 and the associated main valve become non-conductive at the end of the current half-cycle during which the capacitors 73 and 71 were connected, they remain non-conductive and the current flow through the welding transformer 3 is discontinued. The exciting coil 123 of the auxiliary relay 121 is now deenergized and opens the secondary circuit 69 of the impulsing transformer, discontinuing the supply of impulses to the auxiliary valve 31. The auxiliary valve cannot, thereafter again become conductive, regardless of the leakage of the charge from the stopping capacitor 71.

As the disc 77 continues to rotate whatever capacitors 73 happen to be charged are discharged by connection to the discharging brush 91 and prepared for another operation. No additional timing capacitors 73 are now charged because the rectifier 97 is now deenergized. To produce another operation, the starting switch 145 must be opened and reclosed. The opening of the switch deenergizes the starting relay 127 and a normally closed back contactor 197 of the relay short-circuits the stopping capacitor 71, while the contactor 125 closes the circuit through the coil 123 of the auxiliary relay 121 and the source 13 to energize the latter.

The seam welding apparatus disclosed in Fig. 2 is largely similar to the spot welding system just discussed. However, in this case, the auxiliary relay 121 is not necessary. The timing arrangement 199 is similar to the corresponding timer 75 in the spot welder in including the capacitors 73 and the segments 79 arranged on the insulating disc 77. However, the brush structure is different. The seam welding timer 199 incorporates a plurality of fixed peripheral brushes 201, sufficient to correspond to the maximum number of currentless half-cycles which will be desired during any welding operation. The spacing between any two brushes 201 is equal to the spacing between two successive segments 79. In the drawings, four such brushes 201 are illustrated.

The brushes 201 are connected through selector switches 203 to resistors 205 and the resistors are all connected together at their remaining terminals. The common connection point 206 of the resistors 205 is connected to the positive terminal of the biasing capacitor 55 in the control circuit of the auxiliary valve 31. A segment spacing away from the brush 203 on one of the ends of the series another fixed peripheral brush 207 is provided. The brush 207 is connected to the ring brush 91 and also to the cathode 35 of the valve 31. A resistor 208 is connected between the positive terminal of the biasing capacitor 55 and the cathode 35. Finally a single peripheral brush 209 adjustable along the periphery of the disc 77, so that it may be set at any distance from the brush 203 on the open end of the series, is provided. The adjustable brush 209 and the ring brush 91 are connected, respectively, to the negative and positive terminals of the rectifier 97 supplied from the welding transformer 3.

For any welding setting, the selector switches 203 associated with a number of the fixed brushes 201 corresponding to the number of currentless half-periods desired are closed. The brushes selected are those extending in succession from the brush 207 connected to the ring brush 91. The adjustable brush 209 is set at a number of segment spacings from the nearest closed fixed brush 203 which corresponds to the number of half-cycles of welding current that is to flow. In the drawing, the selector switches 203 of all four fixed brushes 201 are closed and the adjustable brush 209 is set at a distance of three segment spacings from the nearest fixed brush 201. In this case, the welding current will flow during one and one-half half-periods, if the disc 77 rotates through an angle corresponding to one segment 79 per half-period.

To initiate a welding operation, the manual switch 145 is closed and a starting relay 211 is energized, closing the secondary circuit 69, of the saturable transformer 59. At an instant in the half-period of the source 13 predetermined by the setting of the rheostat 65 connected to the primary 67 of the welding transformer 59, the auxiliary valve 31 is rendered conductive and current flows through it and the ignition electrodes 23. The main valves 15 and 17 are then successively rendered conductive. Current now flows through the welding transformer 3 and the material 9 is welded, while at the same time the rectifier 97 supplied from the primary 11 of the welding transformer, charges the capacitors 73 as their corresponding segments 201 engage the adjustable brush 209.

When (in the present case after 1½ periods) the first capacitor 73 to be charged engages the fixed brush 201 nearest to the movable brush 209, the potential on the capacitor is impressed through the resistors 293 and 208 in series with the fixed brush 201 in the control circuit of the auxiliary valve 31. The segments 79 are of such length that they engage the brushes 201 during an interval of time that is substantially longer than the interval during which the potential supplied by the impulsing transformer 59 has sufficient magnitude to render the auxiliary valve 31 conductive. Moreover, the disc 77 is so positioned on its shaft that the interval during which the fixed brush 201 is engaged by a segment 79 overlaps the interval during which the impulse potential is applied. The capacitor potential is sufficiently large to counteract the impulse potential and, therefore, when the two potentials are simultaneously applied in the control circuit of the auxiliary valve 31, the valve remains non-conductive.

The same situation is involved when the segment 79 associated with the first charged capacitor 73 engages the remaining fixed brushes 201. The auxiliary valve, therefore, remains non-conductive during the half-cycles corresponding to the engagement of the last-mentioned segment 79 with the set of connected fixed brushes. After the segment 79 associated with the first charged capacitor 73 has engaged the last fixed brush 201, it engages the fixed brush 207 connected to the ring brush 91 and is discharged in preparation for another operation.

Moreover, after the first charged capacitor 73 has been discharged the other capacitors 73 which were charged while the welding transformer 3 was energized and are equal in number to the number of active half-periods, are still effective in the control circuit of the auxiliary valve 31 and, therefore, the valve does not again become conductive until after the last charged capacitor has been discharged. The number of half-periods during which current does not flow is, therefore, dependent on the number of half-periods during which current flows, and the number of fixed brushes 201 connected in the control circuit of the auxiliary valve 31. If $n$ is taken to be the number of fixed brushes, and $m$ the number of half-periods during which current flows, then for a disc which rotates at the rate of one capacitor per half-period, the number of currentless half-periods for a welding operation is equal to $n+m-1$. For the arrangement disclosed in Fig. 2, this is equal to $4+3-1$, or 6.

It is to be noted while the valves 15 and 17 in the modifications shown in Figs. 1 and 2 are illustrated as separate valves, they may, under certain circumstances, be replaced by a single double-polarity valve comprising a pair of mercury pool electrodes in each of which an ignition electrode is immersed.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. For use in controlling the supply of power from a source of periodically pulsating potential to a load, the combination comprising an electric discharge valve of the immersed ignition-electrode type interposed between said source and said load, said valve having a plurality of principal electrodes and an ignition electrode immersed in one of said principal electrodes, a network, consisting of a plurality of impedances, tuned to the frequency of said source, said impedances being so connected that the net impedance of the network to current of the frequency of said source is large, means for connecting said network between said source and said ignition electrode and said one principal electrode so that said network substantially absorbs the potential of said source, and means for transmitting current through one of said impedances and said ignition electrode and said one principal electrode to render said valve conductive.

2. For use in controlling the supply of power from a source of periodically pulsating potential to a load, the combination comprising an electric discharge valve of the immersed ignition-electrode type interposed between said source and said load, said valve having a plurality of principal electrodes and an ignition electrode immersed in one of said principal electrodes, a network, consisting of a capacitor and an inductance connected across the terminals of said capacitor, tuned to the frequency of said source, means for connecting said network between said source and said ignition electrode and said one principal electrode so that said network substantially absorbs the potential of said source, and means for transmitting current through said inductance and said ignition electrode and said one principal electrode to render said valve conductive.

3. For use in supplying an alternating-current load from a source of alternating current, the combination comprising a pair of electric discharge valves of the immersed-ignition-electrode type connected in anti-parallel between said source and said load, each of said valves having in effect an anode, a cathode, and an ignition electrode immersed in said cathode, a parallel-tuned network, consisting of a plurality of impedances, tuned to the frequency of said source and connected between the ignition electrodes of said valves, and means for transmitting current through a portion of the impedance of said network and said ignition electrodes to render said valves conductive.

4. For use in supplying an alternating-current load from a source of alternating current, the combination comprising a pair of electric discharge valves of the immersed-ignition-electrode type connected in anti-parallel between said source and said load, each of said valves having in effect an anode, a cathode, and an ignition electrode immersed in said cathode, a parallel-tuned network, consisting of a plurality of impedances and tuned to the frequency of said source, connected between the ignition electrodes of said valves, and means synchronized with said source, for transmitting current through a portion of the impedance of said network and said ignition electrodes to render said valves conductive.

5. For use in supplying an alternating-current load from a source of alternating current, the combination comprising a pair of electric discharge valves of the immersed-ignition-electrode type connected in anti-parallel between said source and said load, each of said valves having in effect an anode, a cathode, and an ignition electrode immersed in said cathode, a parallel-tuned network, consisting of a capacitor and an inductance and tuned to the frequency of said source, connected between the ignition electrodes of said valves, and means for transmitting current through said inductance and said ignition electrodes to render said valves conductive.

6. Apparatus according to claim 5, characterized by the fact that the inductance is provided with an intermediate tap and the current transmitting means is connected between the ignition electrodes and said intermediate tap.

7. For use in supplying an alternating-current load from a source of alternating current, the combination comprising a pair of electric discharge valves of the immersed-ignition-electrode type connected in anti-parallel between said source and said load, each of said valves having in effect an anode, a cathode, and an ignition electrode immersed in said cathode, a parallel-tuned network, consisting of a plurality of impedances and tuned to the frequency of said source, connected between the ignition electrodes of said valves, one of said impedances having an intermediate tap, a transformer having a primary with terminal taps and an intermediate tap, and a secondary with terminal taps and an intermediate tap, said last-named intermediate taps being connected together, means connecting the terminal taps of said primary to the cathodes of said valves, as asymmetrically conductive auxiliary discharge valve having a plurality of principal electrodes, means for connecting one of the principal electrodes of said auxiliary valve to the intermediate tap of said one impedance, and means connected between the terminal taps of said secondary and said other principal electrode of said auxiliary valve for impressing half-waves of potential of the same polarity between the principal electrodes of said auxiliary valve.

8. For use in supplying an alternating-current load from a source of alternating current, the combination comprising a pair of electric discharge valves of the immersed-ignition-electrode type connected in anti-parallel between said source and said load, each of said valves having in effect an anode, a cathode, and an ignition electrode immersed in said cathode, a parallel-tuned network, consisting of a plurality of impedances and tuned to the frequency of said source, connected between the ignition electrodes of said valves, one of said impedances having an intermediate tap, a transformer having a primary with terminal taps and an intermediate tap, and a secondary with terminal taps and an intermediate tap, said last-named intermediate taps being connected together, means connecting the terminal taps of said primary to the cathodes of said valves, an asymmetrically conductive auxiliary discharge valve having a plurality of principal electrodes, means for connecting one of the principal electrodes of said auxiliary valve to the intermediate tap of said one impedance, full wave rectifying means interposed between the other principal electrode of said auxiliary valve and the terminal taps of said secondary, and means for rendering said auxiliary valve conductive during a predetermined number of half-periods of said source and restraining it from being conductive for another predetermined number of half-periods of said source.

9. For use in controlling the supply of power from a source of periodically pulsating current to a load, the combination comprising electric discharge valve means having control circuit means interposed between said source and said load, a plurality of capacitors, means for successively charging said capacitors, means for connecting said capacitors a predetermined number of periods of said source after they have been so charged in said control circuit means, and means for discharging said capacitors a predetermined number of periods of said source after they have been connected in said control circuit means.

10. For use in controlling the supply of power from a source of current to a load, the combination comprising electric discharge valve means having control circuit means interposed between said source and said load, means for supplying a potential in said control circuit means to render said valve means conductive, a plurality of capacitors, means responsive to said valve means for successively charging said capacitors, means for connecting said capacitors after they have been so charged in said control circuit means in such manner that the potential of said charged capacitors counteracts said first-named potential and said valve means is reverted to a non-conductive condition, and means for thereafter discharging said capacitors in preparation for a recharging operation.

11. For use in controlling the supply of power from a source of current to a load, the combination comprising electric discharge valve means having control circuit means interposed between said source and said load, means for supplying a potential in said control circuit means to render said valve means conductive, a plurality of capacitors, means responsive to the current flow through said load when said valve means is rendered conductive, for successively charging said capacitors, means for connecting said capacitors after they have been so charged in said control circuit means in such manner that the potential of said charged capacitors counteracts said first-named potential and said valve means is reverted to a non-conductive condition, and means for thereafter discharging said capacitors in preparation for a recharging operation.

12. For use in supplying current from a source to a load, the combination comprising electric discharge valve means having control circuit means for controlling the supply of current from said source to said load, means for supplying a potential in said control circuit means to render said valve means conductive and thereby to cause current to be supplied to said load, means responsive to the supply of current through said load to maintain the supply of said potential, capacitative means, means for charging said capacitative means, and means for connecting said capacitative means when so charged in said control circuit means in such manner that the potential of said capacitative means counteracts said first-named potential to render said valve means non-conductive, said maintaining means being actuated to cease to maintain said first-named potential when said valve means is rendered non-conductive by reason of the discontinuance of the supply of current to said load.

13. Apparatus according to claim 12, characterized by the fact that the maintaining means is a relay the coil of which is connected directly across the source before the operation of the system is initiated and is connected across the load after the operation has been initiated, the connection across the source being permanently interrupted just as the flow of load current is initiated.

14. In a system for controlling the supply of power from a source of current to a load, the combination comprising electric discharge valve means interposed between said source and said load, said valve means having control circuit means, a plurality of capacitors, means for supplying a potential in said control circuit means to render said valve means conductive and to successively charge said capacitors, means for connecting said capacitors after they have been so charged in said control circuit means in such manner that the potential of said charged capacitors counteracts said first-named potential and said valve means is reverted to a non-conductive condition, and means for thereafter discharging said capacitors in preparation for a recharging operation.

15. In combination, a first and a second main electric discharge device of the immersed-ignition-electrode type connected in antiparallel for controlling the supply of power from a source to a work circuit, each main discharge device having an anode, a cathode, and an ignition electrode immersed in said cathode, a first control circuit for said first main discharge device, said first control circuit comprising a first unidirectional current path including an auxiliary discharge device connected between the anode and the ignition electrode of said first main device, a second control circuit for said second main discharge device, said second control circuit comprising a second unidirectional current path including the said auxiliary discharge device connected between the anode and the ignition electrode of said second main discharge device, said first and second control circuit being energized solely from said source, and control means for said auxiliary discharge device.

16. For use in controlling the supply of power from a source to a load, the combination comprising an electric discharge valve of the immersed ignition-electrode type interposed between said source and said load, said valve having a plurality of principal electrodes and an ignition electrode immersed in one of said principal electrodes, a network consisting of a plurality of impedances so connected that for current flowing from said source through said network and said ignition electrode the net impedance of the composite network is large compared to the resistance of said ignition electrode, means for connecting different points on said network respectively to said source and said ignition electrode and said one principal electrode so that said network substantially absorbs the potential of said source, at least one portion of said network comprising a single current path between said ignition electrode and said one principal electrode, and means including an auxiliary electric discharge device connected in said single current path for transmitting current through one of said impedances and said ignition electrode and said one principal electrode to render said valve conductive.

17. For use in supplying an alternating-current load from a source of alternating current, the combination comprising a pair of electric discharge valves of the immersed-ignition-electrode type connected in anti-parallel between said source and said load, each of said valves having in effect an anode, a cathode, and an ignition electrode immersed in said cathode, a composite electrical path, consisting of a plurality of elements of the type which individually permit the passage of current but which when combined in said path restrain the passage of current, connected between the ignition electrodes of said valves, said composite path having an intermediate junction, and means including an auxiliary electric discharge device connected to said junction for transmitting current through said individual elements and said ignition electrodes to render said valves conductive.

13. In a system for supplying power from a source to a load, the combination comprising a pair of electric discharge valves of the immersed-ignition-electrode type connected in anti-parallel between said source and said load, each of said valves having a plurality of principal electrodes and an ignition electrode immersed in said cathode, an impedance circuit connected between the ignition electrodes of said valves, said impedance circuit having an intermediate junction, an auxiliary discharge device, circuit means for connecting said auxiliary discharge device between said intermediate junction and certain of said principal electrodes of said valves.

FINN H. GULLIKSEN.